US008325633B2

(12) United States Patent
Archer et al.

(10) Patent No.: US 8,325,633 B2
(45) Date of Patent: Dec. 4, 2012

(54) REMOTE DIRECT MEMORY ACCESS

(75) Inventors: Charles J. Archer, Rochester, MN (US); Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 11/740,361

(22) Filed: Apr. 26, 2007

(65) Prior Publication Data

US 2008/0267066 A1 Oct. 30, 2008

(51) Int. Cl.
*H04B 1/44* (2006.01)
(52) U.S. Cl. ........................................ 370/282
(58) Field of Classification Search .............. 370/282; 709/212
See application file for complete search history.

(56) References Cited

U.S. PATENT DOCUMENTS

| | | | |
|---|---|---|---|
| 4,933,846 A | 6/1990 | Humphrey et al. | |
| 5,050,162 A | 9/1991 | Golestani | |
| 5,136,582 A | 8/1992 | Firoozmand | |
| 5,448,698 A | 9/1995 | Wilkes | |
| 5,617,537 A | 4/1997 | Yamada et al. | |
| 5,680,116 A | 10/1997 | Hashimoto et al. | |
| 5,689,509 A | 11/1997 | Gaytan et al. | |
| 5,758,075 A | 5/1998 | Graziano et al. | |
| 5,790,530 A | 8/1998 | Moh et al. | |
| 5,796,735 A | 8/1998 | Miller et al. | |
| 5,802,366 A | 9/1998 | Row et al. | |
| 5,954,794 A | 9/1999 | Fishler et al. | |
| 5,961,659 A | 10/1999 | Benner | |
| 6,070,189 A * | 5/2000 | Bender et al. | 709/224 |
| 6,072,781 A | 6/2000 | Feeney et al. | |
| 6,105,122 A * | 8/2000 | Muller et al. | 712/1 |
| 6,161,198 A | 12/2000 | Hill et al. | |
| 6,356,951 B1 | 3/2002 | Gentry, Jr. | |
| 6,711,632 B1 | 3/2004 | Chow et al. | |
| 6,735,662 B1 | 5/2004 | Conner | |
| 6,744,765 B1 | 6/2004 | Dearth et al. | |
| 6,754,732 B1 * | 6/2004 | Dixon et al. | 710/22 |
| 6,857,030 B2 | 2/2005 | Webber | |
| 6,977,894 B1 | 12/2005 | Achilles et al. | |

(Continued)

OTHER PUBLICATIONS

U.S. Appl. No. 11/776,707, filed Jul. 12, 2007, Blocksome.

(Continued)

*Primary Examiner* — Anh-Vu Ly
*Assistant Examiner* — Christopher R Crompton
(74) *Attorney, Agent, or Firm* — Biggers & Ohanian, LLP

(57) ABSTRACT

Methods, parallel computers, and computer program products are disclosed for remote direct memory access. Embodiments include transmitting, from an origin DMA engine on an origin compute node to a plurality target DMA engines on target compute nodes, a request to send message, the request to send message specifying a data to be transferred from the origin DMA engine to data storage on each target compute node; receiving, by each target DMA engine on each target compute node, the request to send message; preparing, by each target DMA engine, to store data according to the data storage reference and the data length, including assigning a base storage address for the data storage reference; sending, by one or more of the target DMA engines, an acknowledgment message acknowledging that all the target DMA engines are prepared to receive a data transmission from the origin DMA engine; receiving, by the origin DMA engine, the acknowledgement message from the one or more of the target DMA engines; and transferring, by the origin DMA engine, data to data storage on each of the target compute nodes according to the data storage reference using a single direct put operation.

12 Claims, 9 Drawing Sheets

U.S. PATENT DOCUMENTS

| | | | |
|---|---|---|---|
| 6,981,074 B2 | 12/2005 | Oner et al. | |
| 7,031,305 B1 | 4/2006 | Yu et al. | |
| 7,089,289 B1 | 8/2006 | Blackmore et al. | |
| 7,111,092 B1 | 9/2006 | Mitten et al. | |
| 7,120,916 B1 | 10/2006 | Firth et al. | |
| 7,155,541 B2 | 12/2006 | Ganapathy et al. | |
| 7,890,670 B2 | 2/2011 | Archer et al. | |
| 2002/0138697 A1* | 9/2002 | Kanda | 711/114 |
| 2003/0233497 A1 | 12/2003 | Shih | |
| 2004/0057380 A1 | 3/2004 | Biran et al. | |
| 2004/0078405 A1 | 4/2004 | Bhanot et al. | |
| 2004/0218631 A1 | 11/2004 | Ganfield | |
| 2005/0033874 A1 | 2/2005 | Futral et al. | |
| 2005/0091334 A1 | 4/2005 | Chen et al. | |
| 2005/0114561 A1 | 5/2005 | Lu et al. | |
| 2005/0182884 A1* | 8/2005 | Hofmann et al. | 710/305 |
| 2005/0198113 A1 | 9/2005 | Mohamed et al. | |
| 2006/0045005 A1 | 3/2006 | Blackmore et al. | |
| 2006/0045109 A1 | 3/2006 | Blackmore et al. | |
| 2006/0047771 A1 | 3/2006 | Blackmore et al. | |
| 2006/0056405 A1 | 3/2006 | Chang et al. | |
| 2006/0075057 A1 | 4/2006 | Gildea et al. | |
| 2006/0206635 A1 | 9/2006 | Alexander et al. | |
| 2006/0230119 A1 | 10/2006 | Hausauer et al. | |
| 2006/0253619 A1 | 11/2006 | Torudbakken et al. | |
| 2007/0041383 A1 | 2/2007 | Banikazemi et al. | |
| 2007/0165672 A1 | 7/2007 | Keels et al. | |
| 2007/0174506 A1* | 7/2007 | Tsuruta | 710/22 |
| 2007/0204073 A1* | 8/2007 | Chen et al. | 710/22 |
| 2008/0109573 A1* | 5/2008 | Leonard et al. | 710/24 |
| 2008/0222317 A1 | 9/2008 | Go et al. | |
| 2008/0273543 A1 | 11/2008 | Blocksome et al. | |
| 2009/0125604 A1* | 5/2009 | Chang et al. | 709/212 |
| 2009/0276582 A1* | 11/2009 | Furtek et al. | 711/149 |

OTHER PUBLICATIONS

U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.
Moreira, et al.; The Blue Gene/L Supercomputer: A Hardware and Software Story; International Journal of Parallel Programming; Jun. 2007; pp. 181-206; vol. 35, No. 3; Springer Science+Business Media, LLC; USA.
Office Action, U.S. Appl. No. 11/764,302, filed Jul. 28, 2010.
Office Action, U.S. Appl. No. 11/776,707, filed Jul. 14, 2010.
Notice of Allowance, U.S. Appl. No. 11/746,333, filed Jun. 23, 2010.
Notice of Allowance, U.S. Appl. No. 11/829,325, filed May 21, 2010.
Notice of Allowance, U.S. Appl. No. 11/739,948, filed Jul. 7, 2010.
Office Action, U.S. Appl. No. 11/740,361, filed Apr. 30, 2010.
Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance, U.S. Appl. No. 11/754,719, filed Apr. 6, 2010.
Office Action, U.S. Appl. No. 11/744,319, filed May 12, 2010.
Office Action, U.S. Appl. No. 11/829,317, filed May 26, 2010.
Final Office Action, U.S. Appl. No. 11/746,348, filed Feb. 23, 2010.
Notice of Allowance, U.S. Appl. No. 11/758,167, filed Mar. 12, 2010.
Office Action, U.S. Appl. No. 11/754,719, filed Oct. 14, 2008.
Office Action, U.S. Appl. No. 11/754,719, filed Mar. 4, 2009.
Office Action, U.S. Appl. No. 11/758,167, filed Nov. 21, 2008.
Office Action, U.S. Appl. No. 11/744,296, filed Aug. 20, 2009.
Office Action, U.S. Appl. No. 11/746,348, filed Sep. 2, 2009.
Final Office Action, U.S. Appl. No. 11/758,167, filed Apr. 24, 2009.
Final Office Action, U.S. Appl. No. 11/754,719, filed Aug. 5, 2009.
Final Office Action, U.S. Appl. No. 11/744,296, filed Feb. 24, 2010.
Notice of Allowance, U.S. Appl. No. 11/746,348, filed Oct. 5, 2010.
Ron Brightwell, Keith D. Underwood, "An Analysis of NIC Resource Usage for Offloading MPI," ipdps, vol. 9, pp. 183a, 18th International Parallel and Distributed Processing Symposium (IPDPS'04)—Workshop 8, 2004.
Keith D. Underwood, Ron Brightwell, "The Impact of MPI Queue Usage on Message Latency," icpp, pp. 152-160, 2004 International Conference on Parallel Processing (ICPP'04), 2004.
Keith D. Underwood, K. Scott Hemmert, Arun Rodrigues, Richard Murphy, Ron Brightwell, "A Hardware Acceleration Unit for MPI Queue Processing," ipdps, vol. 1, pp. 96b, 19th IEEE International Parallel and Distributed Processing Symposium (IPDPS'05)—Papers, 2005.
RCE, U.S. Appl. No. 11/740,361, filed Jan. 30, 2012.
Notice of Allowance, U.S. Appl. No. 11/755,501, filed Jun. 9, 2011.
Final Office Action, U.S. Appl. No. 11/776,718, filed Mar. 30, 2012.
Final Office Action, U.S. Appl. No. 11/740,361, filed Sep. 29, 2011.
Office Action, U.S. Appl. No. 11/776,718, filed Oct. 19, 2011.

* cited by examiner

REMOTE DIRECT MEMORY ACCESS

STATEMENT REGARDING FEDERALLY SPONSORED RESEARCH OR DEVELOPMENT

This invention was made with Government support under Contract No. B519700 awarded by the Department of Energy. The Government has certain rights in this invention.

BACKGROUND OF THE INVENTION

1. Field of the Invention

The field of the invention is data processing, or, more specifically, methods, apparatus, and products for remote direct memory access.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

In large processing systems using conventional direct memory access ('DMA') protocols, each target DMA engine typically receives data packets at the target nodes in a DMA memory first-in-first-out ('FIFO') buffer. Each packet in the memory FIFO buffer must be processed by the target processor core which consumes computational resources. When high bandwidth is important, such conventional protocols may be insufficient.

SUMMARY OF THE INVENTION

Methods, parallel computers, and computer program products are disclosed for remote direct memory access. Embodiments include transmitting, from an origin DMA engine on an origin compute node to a plurality target DMA engines on target compute nodes, a request to send message, the request to send message specifying a data to be transferred from the origin DMA engine to data storage on each target compute node; receiving, by each target DMA engine on each target compute node, the request to send message; preparing, by each target DMA engine, to store data according to the data storage reference and the data length, including assigning a base storage address for the data storage reference; sending, by one or more of the target DMA engines, an acknowledgment message acknowledging that all the target DMA engines are prepared to receive a data transmission from the origin DMA engine; receiving, by the origin DMA engine, the acknowledgement message from the one or more of the target DMA engines; and transferring, by the origin DMA engine, data to data storage on each of the target compute nodes according to the data storage reference using a single direct put operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
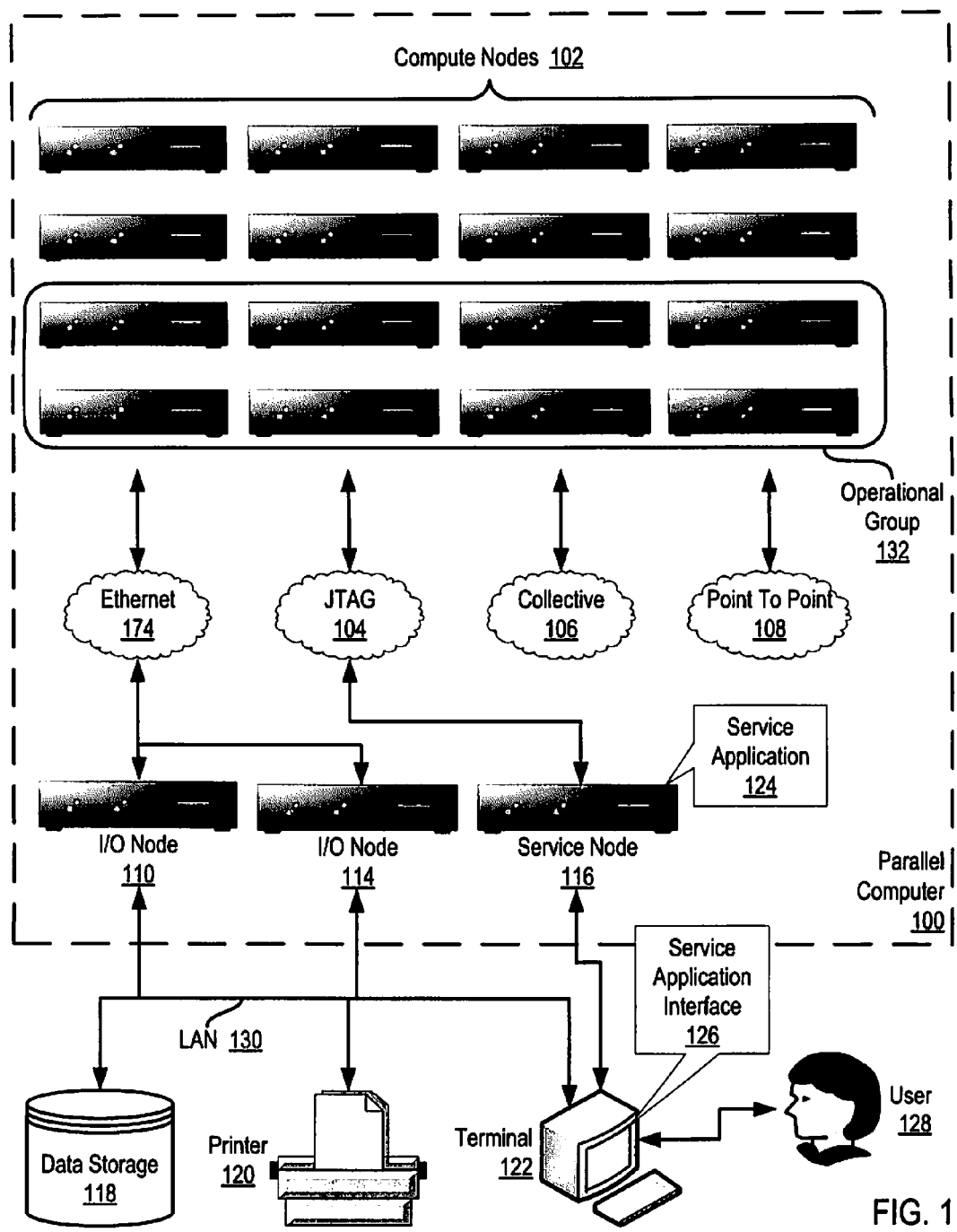
FIG. 1 illustrates an exemplary system for remote direct memory access according to embodiments of the present invention.

Exemplary methods, computers, and computer program products for remote direct memory access according to embodiments of the present invention are described with reference to the accompanying drawings, beginning with FIG. 1. FIG. 1 illustrates an exemplary system for remote direct memory access according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX   | maximum              |
| MPI_MIN   | minimum              |
| MPI_SUM   | sum                  |
| MPI_PROD  | product              |
| MPI_LAND  | logical and          |
| MPI_BAND  | bitwise and          |
| MPI_LOR   | logical or           |
| MPI_BOR   | bitwise or           |
| MPI_LXOR  | logical exclusive or |
| MPI_BXOR  | bitwise exclusive or |

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally to for remote direct memory access by transmitting, from an origin DMA engine on an origin compute node to a plurality target DMA engines on target compute nodes, a request to send message, the request to send message specifying a data to be transferred from the origin DMA engine to data storage on each target compute node; receiving, by each target DMA engine on each target compute node, the request to send message; preparing, by each target DMA engine, to store data according to the data storage reference and the data length, including assigning a base storage address for the data storage reference; sending, by one or more of the target DMA engines, an acknowledgment message acknowledging that all the target DMA engines are prepared to receive a data transmission from the origin DMA engine; receiving, by the origin DMA engine, the acknowledgement message from the one or more of the target DMA engines; and transferring, by the origin DMA engine, data to data storage on each of the target compute nodes according to the data storage reference using a single direct put operation.

The arrangement of nodes, networks, and I/O devices making up the exemplary system illustrated in FIG. 1 are for explanation only, not for limitation of the present invention. Data processing systems capable of remote direct memory access according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of remote direct memory access according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Remote direct memory access according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of remote direct memory access according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks.

Alternatively, existing prior art libraries may be used. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
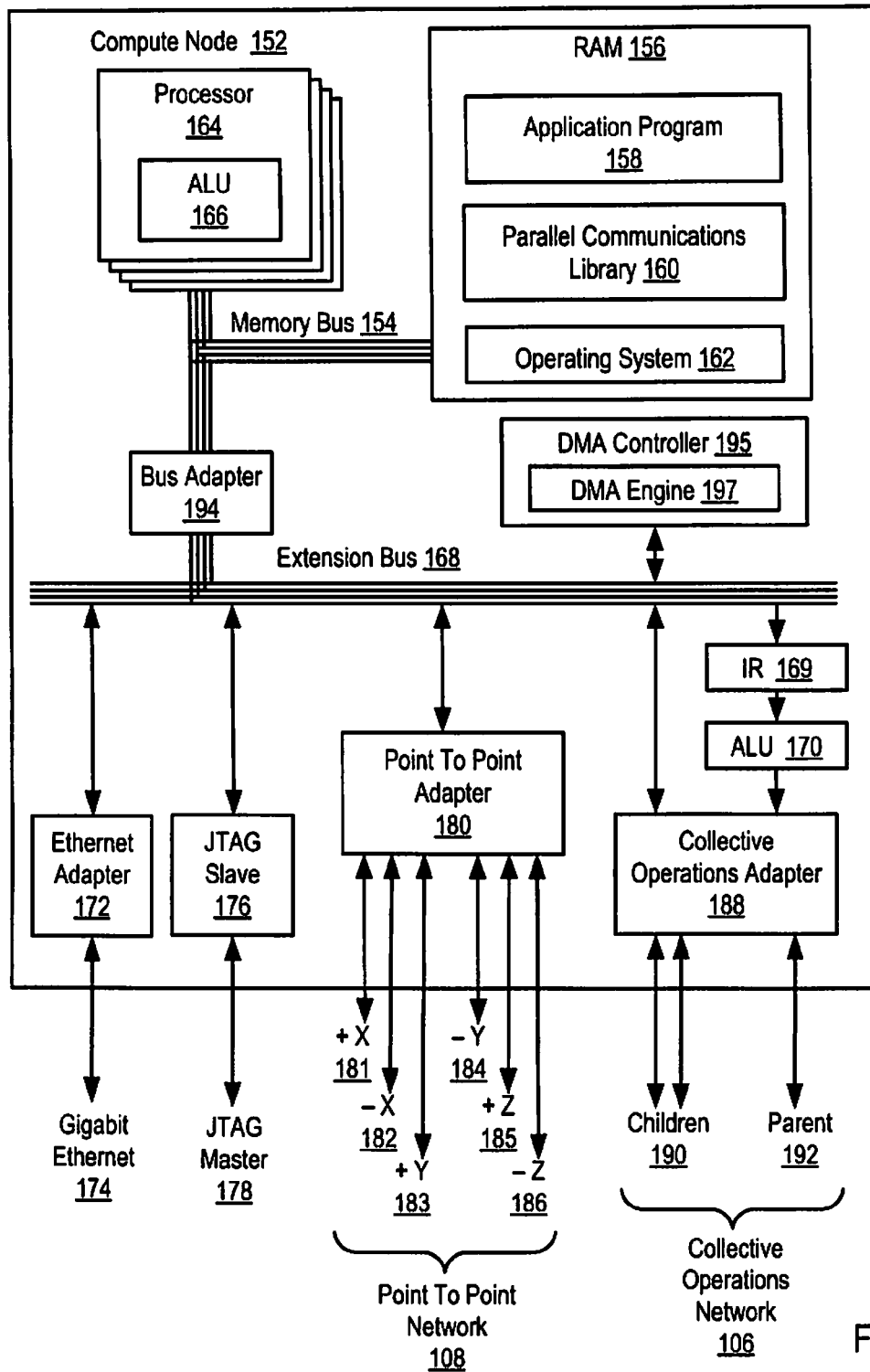
FIG. 2 sets forth a block diagram of an exemplary compute node useful in a parallel computer capable of remote direct memory access according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for remote direct memory access according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: it typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in remote direct memory access according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), -x (182), +y (183), -y (184), +z (185), and -z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195) computer hardware for direct memory access and a DMA engine (195) computer software for direct memory access. Direct memory access includes reading and writing to memory of compute nodes with reduced operational burden on the central processing units (164). A DMA transfer essentially copies a block of memory from one compute node to another. While the CPU initiates the DMA transfer, the CPU does not execute it. The DMA engine (195) of FIG. 2 is useful in remote direct memory access according to embodiments of the present invention such that the DMA of FIG. 2 is capable of transmitting to other DMA engines request to send messages, receiving from other DMA engines request to send messages, preparing to store data, sending acknowledgment messages acknowledging that the DMA engine is are prepared to receive a data transmission from other DMA engines; receiving such the acknowledgement messages from another DMA engines, and transferring data to data storage on another target compute nodes using a direct put operation.

A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

Figure 3A:
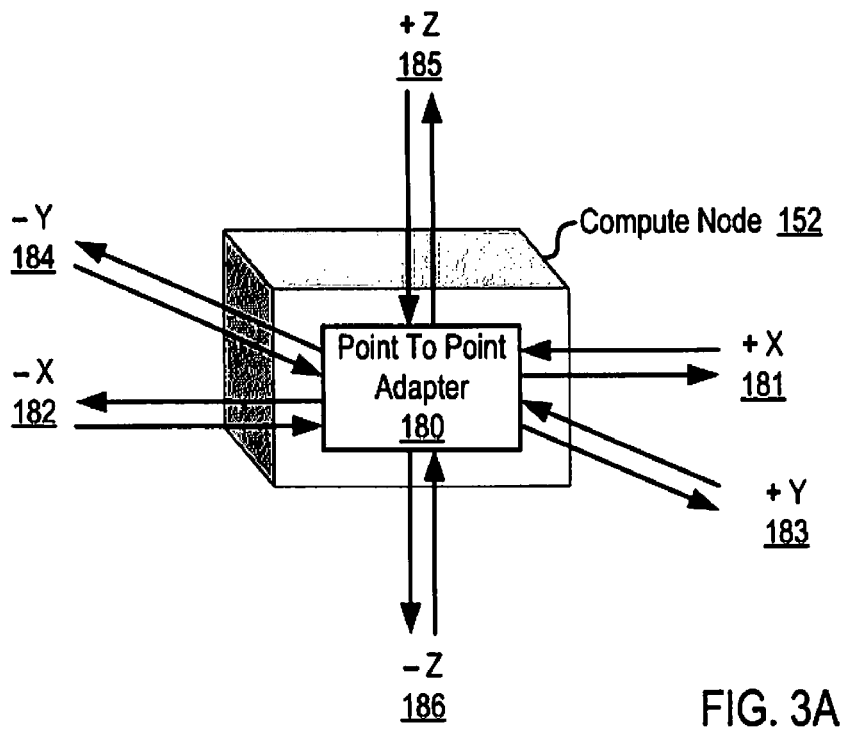
FIG. 3A illustrates an exemplary Point To Point Adapter useful in systems for remote direct memory access according to embodiments of the present invention.

For further explanation, FIG. 3A illustrates an exemplary Point To Point Adapter (180) useful in systems for remote direct memory access according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
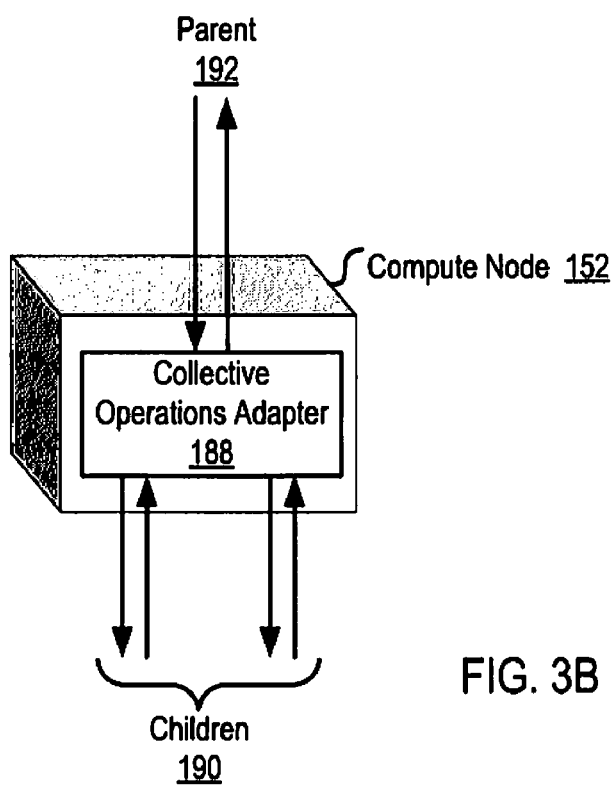
FIG. 3B illustrates an exemplary Collective Operations Adapter useful in systems for remote direct memory access according to embodiments of the present invention.

For further explanation, FIG. 3B illustrates an exemplary Collective Operations Adapter (188) useful in systems for remote direct memory access according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
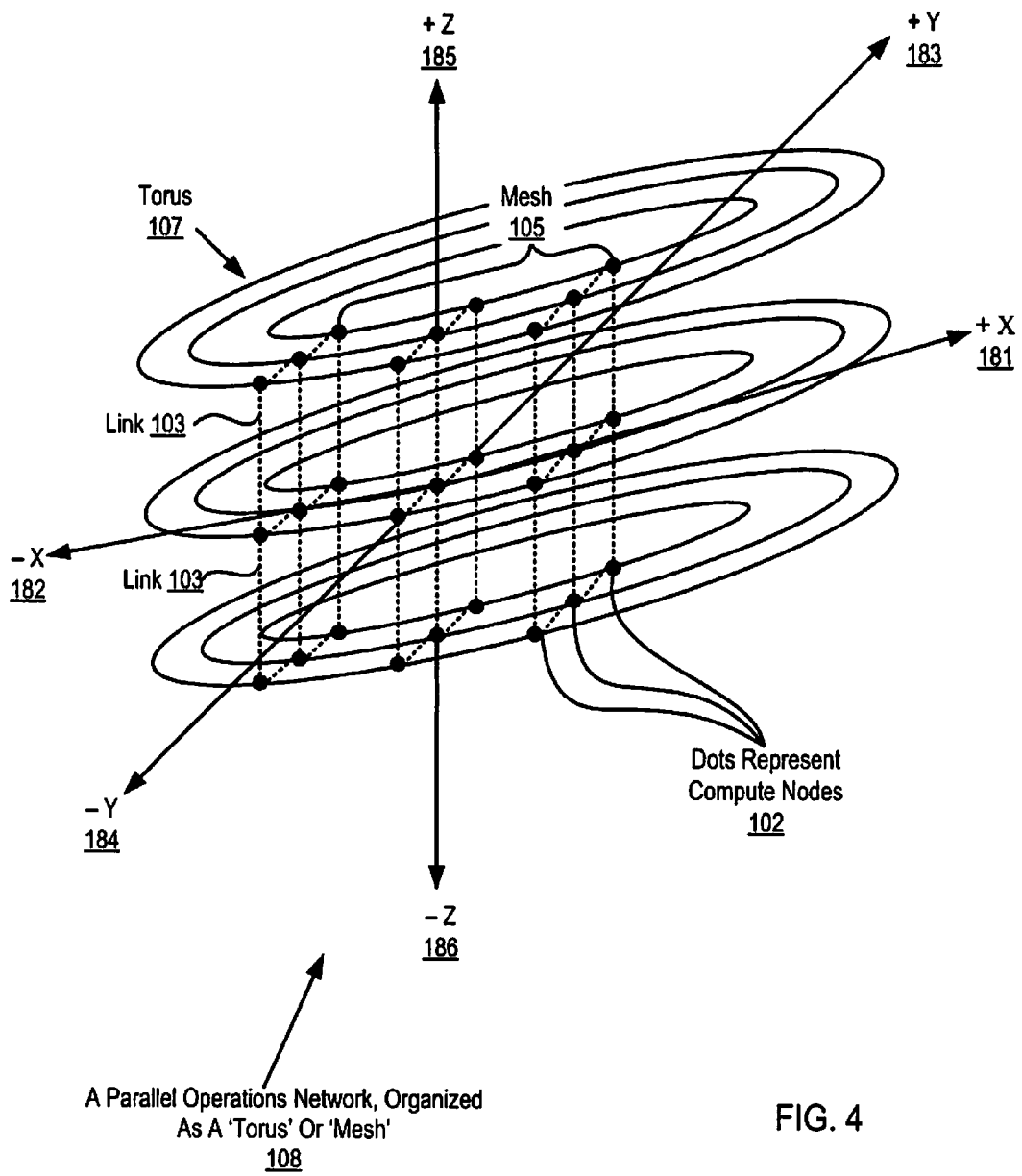
FIG. 4 illustrates an exemplary data communications network optimized for point to point operations.

For further explanation, FIG. 4 illustrates an exemplary data communications network optimized for point to point operations (108). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in remote direct memory access on accordance with embodiments of the present invention may contain only a few compute nodes or may contain thousands of compute nodes.

Figure 5:
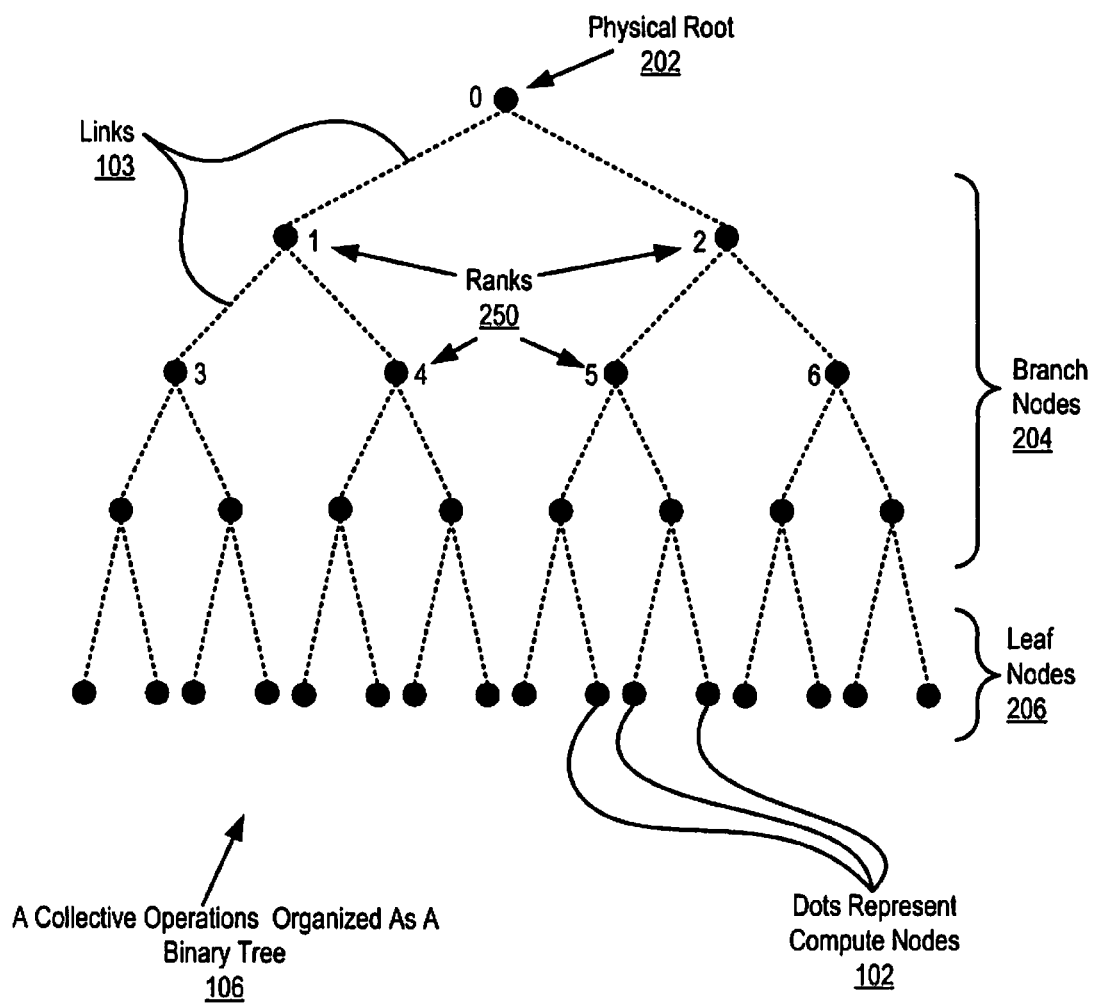
FIG. 5 illustrates an exemplary data communications network optimized for collective operations by organizing compute nodes in a tree.

For further explanation, FIG. 5 illustrates an exemplary data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for remote direct memory access accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
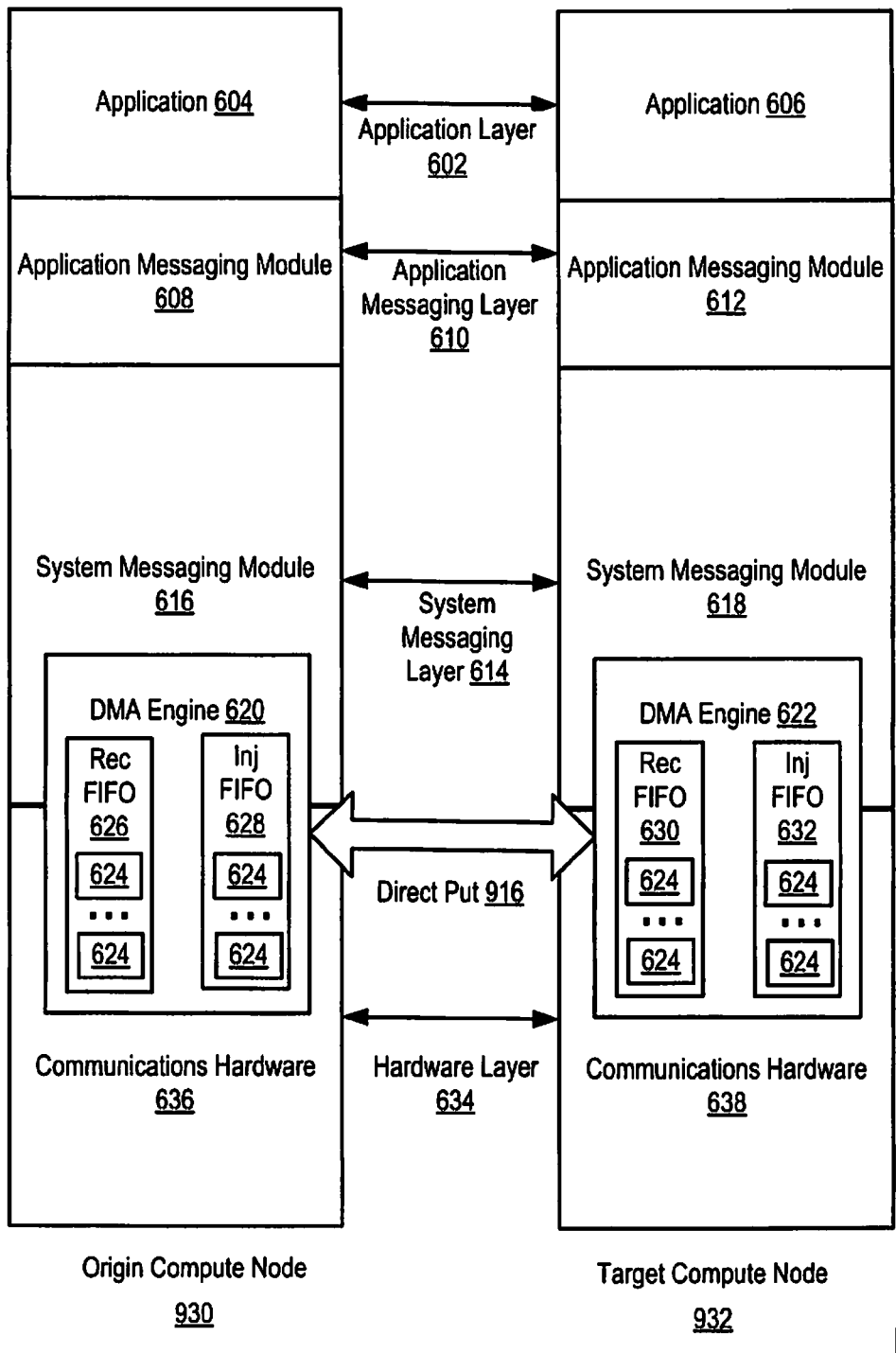
FIG. 6 sets forth a block diagram illustrating an exemplary communications architecture illustrated as a protocol stack useful in remote direct memory access according to embodiments of the present invention.

For further explanation, FIG. 6 sets forth a block diagram illustrating an exemplary communications architecture illustrated as a protocol stack useful in remote direct memory access according to embodiments of the present invention. The exemplary communications architecture of FIG. 6 sets forth two compute nodes, compute node (930) and compute node (932). Only two compute nodes are illustrated in the example of FIG. 6 for ease of explanation and not for limitation. In fact, remote direct memory access according to embodiments of the present invention may be implemented using many compute nodes in very large scale computer systems such as parallel computers with thousands of nodes.

The exemplary communications architecture of FIG. 6 includes an application layer (602) that implements communications between applications (604, 606) running on the compute nodes (930 and 932) by invoking functions in an application messaging module (606) installed on each compute node (930 and 932). Communications among the applications (604 and 606) in the application layer (608) are effected through messages passed between applications. Applications may communicate messages invoking function of an application programming interface ('API') exposed by the application messaging modules (606).

The exemplary communications architecture of FIG. 6 includes a system messaging layer (610) that implements system specific protocols for communications that support messaging in the application layer (602) and the application messaging layer (610). Such system specific protocols are typically invoked through a set of APIs that are exposed to the application messaging modules (608 and 612) in the application messaging layer (610). Such system specific protocols used for communications in the system messaging layer (614)

are typically isolated from the application layer (602) making the application layer somewhat independent of system specific details.

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (930 and 932) on the physical network medium.

The exemplary communications architecture of FIG. 6 illustrates a DMA engine (620) for the origin compute node (930) and a DMA engine (622) for a target compute node (932). The DMA engines (620 and 622) in the example of FIG. 6 are illustrated in both the system messaging module layer (610) and the communications hardware layer (926). The DMA engines (620 and 622) are shown in both the system messaging module layer (610) and the communications hardware layer (634) because DMA engines useful in remote direct memory access according to embodiments of the present invention often provide system messaging level interfaces and also implement communications according to some aspects of the communication hardware layer (926). The exemplary DMA engines (620 and 622) of FIG. 6 each include a reception fifo buffer (626 and 630) that include data descriptors (624) for messages and data received from other DMA engines on other compute nodes through a memory fifo data transfer. The exemplary DMA engines (620 and 622) of FIG. 6 each also include an injection fifo buffer (628 and 632) that include data descriptors (624) for messages and data to be sent to other DMA engines on other compute nodes through a memory fifo data transfer.

A memory fifo data transfer operation is a mode of transferring data using a DMA engine on an origin node and a DMA engine on a target node. In a memory fifo data transfer operation, data is transferred along with a data descriptor describing the data from an injection fifo for the origin DMA engine to a target DMA engine. The target DMA engine in turns places the descriptor in the reception fifo and caches the data. A core processor then retrieves the data descriptor from the reception fifo and processes the data in cache either by instructing the DMA to store the data directly or carrying out some processing on the data, such as even storing the data by the core processor.

The DMA engines (620 and 622) of FIG. 6 are also capable of transferring data through a direct put operation (916). As mentioned above, a direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

The DMA engines (620 and 622) of FIG. 6 are also capable of remote direct memory access according to the present invention. DMA engines (620 and 622) are capable of transmitting, from an origin DMA engine (620) on an origin compute node (930) to a plurality target DMA engines (622) on target compute nodes (932), a request to send message, the request to send message specifying a data to be transferred from the origin DMA engine to data storage on each target compute node; receiving, by each target DMA engine (622) on each target compute node (932), the request to send message; preparing, by each target DMA engine (622), to store data according to the data storage reference and the data length, including assigning a base storage address for the data storage reference; sending, by one or more of the target DMA engines (622), an acknowledgment message acknowledging that all the target DMA engines (622) are prepared to receive a data transmission from the origin DMA engine (620); receiving, by the origin DMA engine (620), the acknowledgement message from the one or more of the target DMA engines (622); and transferring, by the origin DMA engine (620), data to data storage on each of the target compute nodes (932) according to the data storage reference using a single direct put operation (916).

Figure 7:
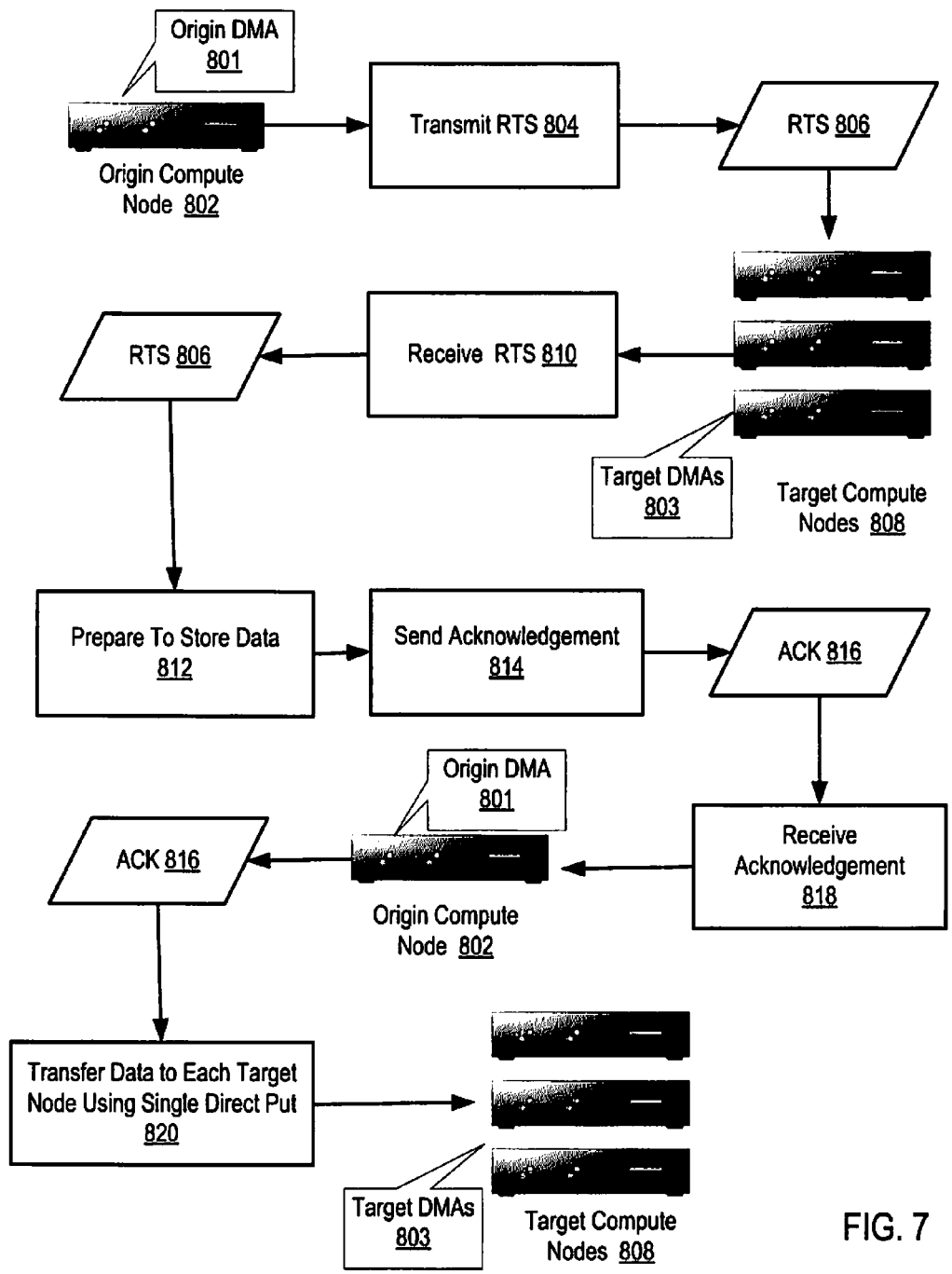
FIG. 7 sets forth a flow chart illustrating an exemplary method for remote direct memory access according to the present invention.

For further explanation, FIG. 7 sets forth a flow chart illustrating an exemplary method for remote direct memory access according to the present invention. The method of FIG. 7 includes transmitting (806), from an origin DMA engine (801) on an origin compute node (802) to a plurality target DMA engines (803) on target compute nodes (808), a request to send message (806). The request to send message (806) typically identifies data to be sent from the origin DMA engines (801) to the target DMA engines (803) and also typically specifies a data storage reference and a data length. The data storage reference may be implemented as an address space and an offset from that address space identifying the beginning storage location of the data to be sent. The data length provides the size of the data to be stored. A target DMA engine receiving such a request to send may then use the data storage reference and data length to identify data storage on the target node for storing the data upon receipt from the origin DMA engine.

Transmitting (806), from an origin DMA engine (801) on an origin compute node (802) to a plurality target DMA engines (803) on target compute nodes (808), a request to send message (806) may be carried out by broadcasting, from an origin DMA engine on an origin compute node to a plurality target DMA engines on target compute nodes, a request to send message as described below with reference to FIG. 8. The broadcasted a request to send message is received by the target node, a copy of the request to send message is stored and the request to send message is immediate forwarded to the next compute node without processing the message. Upon receiving a broadcasted request to send message, each receiving target returns an acknowledgement message as described below with reference to FIG. 8.

Figure 9:
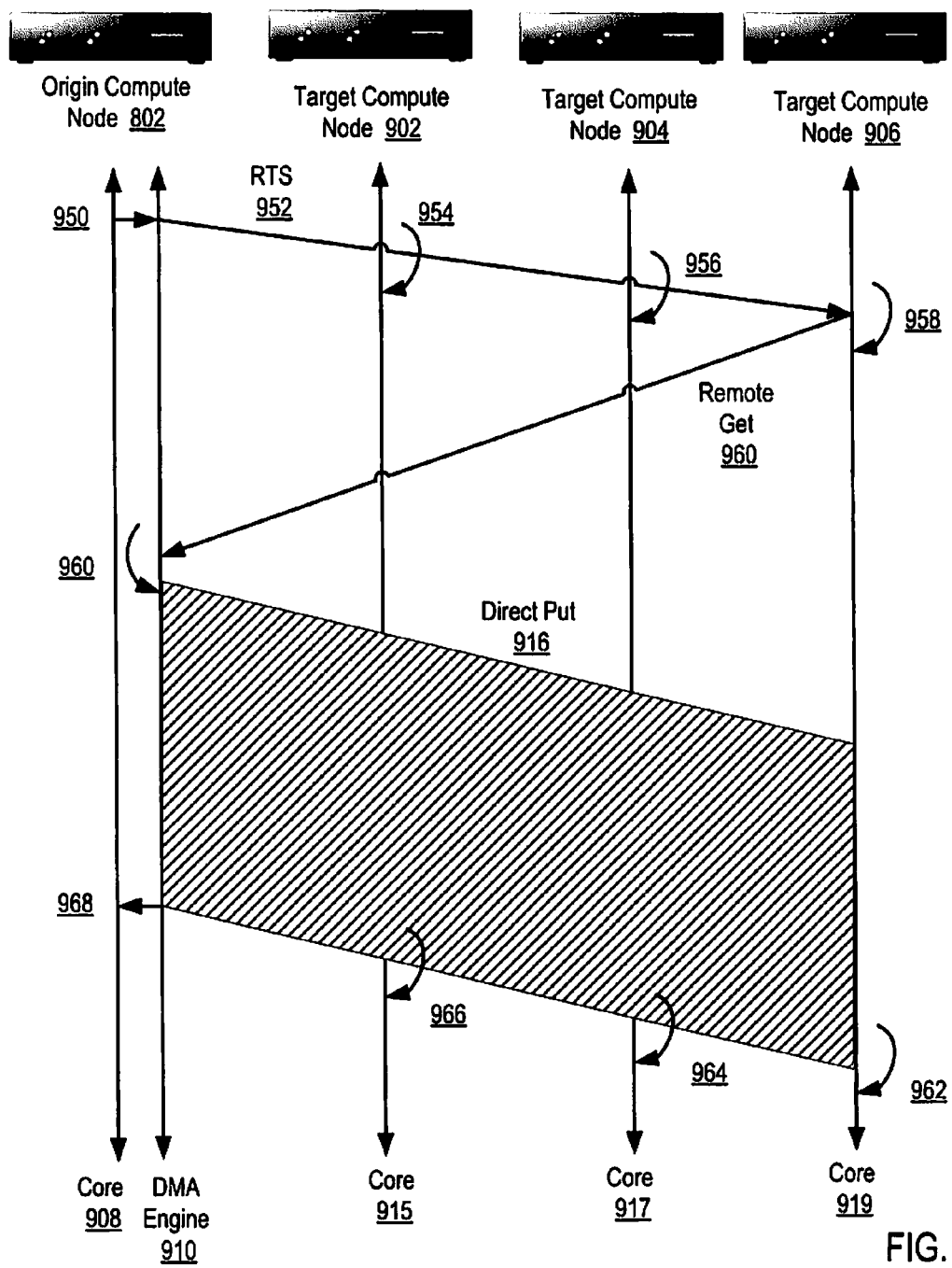
FIG. 9 sets forth a calling sequence diagram illustrating a method for remote direct memory access according to the present invention that uses a store and forward implementation and in which only one target DMA engine sends to the origin DMA an acknowledgement message acknowledging that all the target DMA engine are prepared to receive a data transmission from the origin DMA engine.

Transmitting (806), from an origin DMA engine (801) on an origin compute node (802) to a plurality target DMA engines (803) on target compute nodes (808), a request to send message (806) may use another store and forward implementation described below with reference to FIG. 9. The request to send message transmitted according to a store and forward implementation of FIG. 9 is processing by a target DMA engine to include in the request to send message data storage information about that target compute node. The processed request to send message is then forwarded to another target DMA engine to be processed and forwarded. In such an implementation only the last DMA engine to process the request to send message sends an acknowledgement message to the origin DMA engine acknowledging all the DMA engines are prepared to receive data.

The method of FIG. 7 includes receiving (810), by each target DMA engine (803) on each target compute node (808), the request to send message (806) and preparing (812), by each target DMA engine (803), to store data according to the data storage reference and the data length, including assigning a base storage address for the data storage reference. The base storage address is typically an initial address on the target compute node for storing the data upon receipt from the origin DMA engine.

The method of FIG. 7 also includes sending (814), by one or more of the target DMA engines (803), an acknowledgment message (816) acknowledging that all the target DMA engines (803) are prepared to receive a data transmission from the origin DMA engine (801). Sending (814), by one or more of the target DMA engines (803), an acknowledgment message (816) acknowledging that all the target DMA engines (803) are prepared to receive a data transmission from the origin DMA engine (801) may be carried out by sending, by each target DMA engine, an acknowledgement to the origin DMA engine as described below with reference to FIG. 8.

Alternatively, sending (814), by one or more of the target DMA engines (803), an acknowledgment message (816) acknowledging that all the target DMA engines (803) are prepared to receive a data transmission from the origin DMA engine (801) may be carried out by sending, by only the last target DMA engine, an acknowledgement to the origin DMA engine as described below with reference to FIG. 9.

The method of FIG. 7 also includes receiving (818), by the origin DMA engine (801), the acknowledgement message (816) from the one or more of the target DMA engines (803). Receiving (818), by the origin DMA engine (801), the acknowledgement message (816) from the one or more of the target DMA engines (803) may be carried out by establishing, by the origin DMA engine, a check-in counter having a value equal to the number of target DMA engines; decrementing, by the origin DMA engine the check-in counter upon receiving an acknowledgement message from each target DMA engine; and instructing, by the origin DMA engine upon decrementing the check-in counter to zero, a processing core on the origin compute node to initiate the single direct put operation as described below with reference to FIG. 8.

Receiving (818), by the origin DMA engine (801), the acknowledgement message (816) from the one or more of the target DMA engines (803) alternatively may be carried out by receiving a remote get message from the last target compute node to receive the request to send message as described below with reference to FIG. 9.

The method of FIG. 7 includes transferring (820), by the origin DMA engine (801), data to data storage on each of the target compute nodes (808) according to the data storage reference using a single direct put operation. A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

The direct put operation in the example of FIG. 7 is implemented as a single direct put operation that is broadcast to all the target compute nodes. The direct put is implemented as a single direct put by setting a deposit bit on each packet used to transmit the data of the direct put operation sent to each target DMA. Setting the deposit bit on each packet used to transmit the data of the direct put operation instructs each target DMA to store the data and forward the data to the next target node.

As mentioned above, in some embodiments of remote direct memory access according to the present invention, a request to send message is broadcast to each target DMA and an acknowledgement message is sent in response from each target DMA to the origin DMA. For further explanation, FIG. 8 sets forth a calling sequence diagram illustrating a method for remote direct memory access according to the present invention in which a request to send message is broadcast to each target DMA and each target DMA engine sends to the origin DMA an acknowledgement message acknowledging that the target DMA engine is prepared to receive a data transmission.

Figure 8:
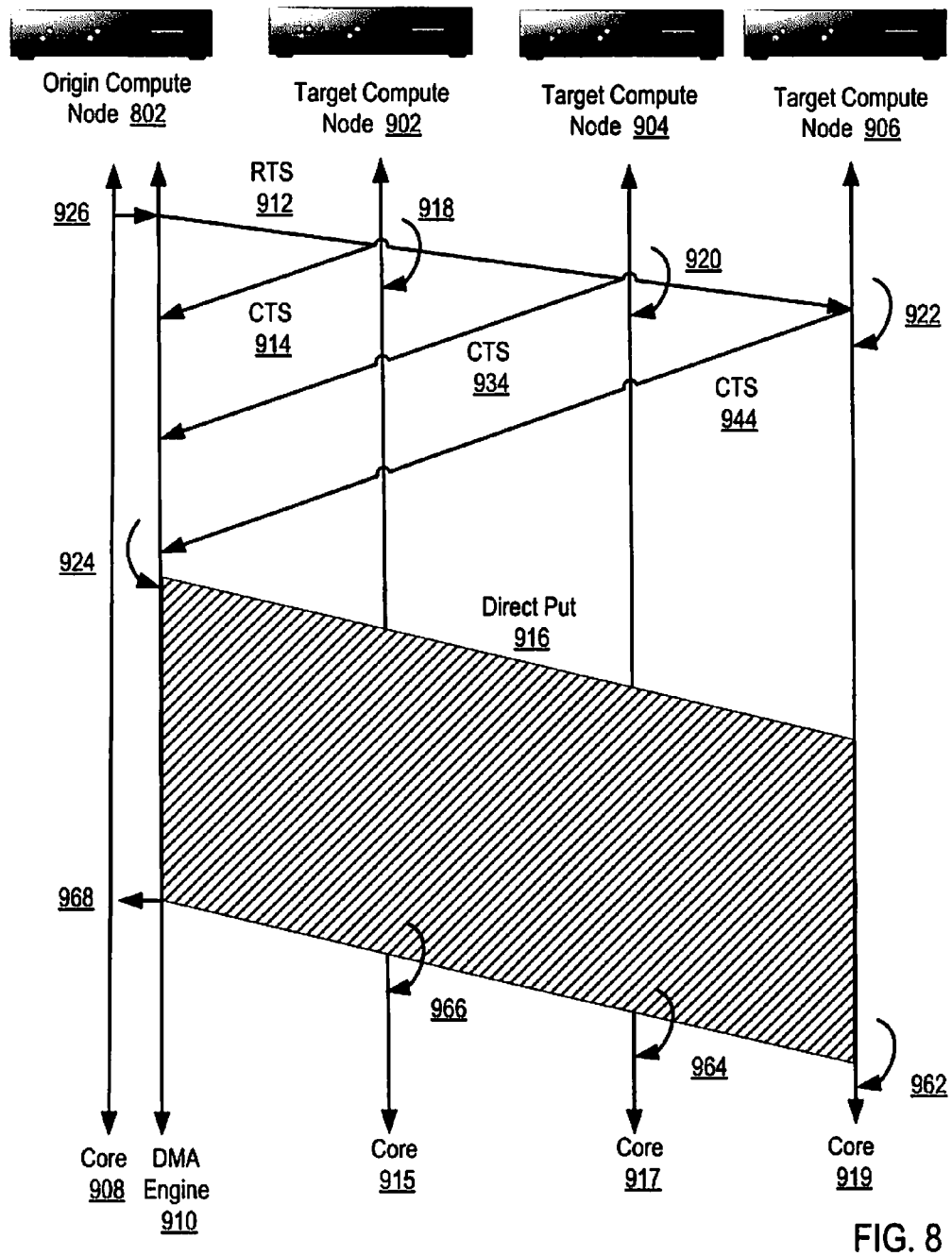
FIG. 8 sets forth a calling sequence diagram illustrating a method for remote direct memory access according to the present invention in which a request to send message is broadcast to each target DMA and each target DMA engine sends to the origin DMA an acknowledgement message acknowledging that the target DMA engine is prepared to receive a data transmission.

In the example of FIG. 8, a processor core (908) of the origin compute node (802) invokes a function call (926) on the DMA engine (910) of the origin compute node (802) to initiate a direct put operation to transfer data to data storage on the target compute nodes (902, 904, and 906). In the example of FIG. 8, in response to the function call (926), the DMA engine (910) broadcasts a request to send (912) message to each target compute node (902, 904, 906) a descriptor of which is placed in a reception fifo buffer of each target DMA engine of each target compute node (902, 904, and 906). The request to send message in the example of FIG. 8 is broadcast in the sense that the message is transmitted to a DMA engine on a first target compute node (902) who stores a copy of the request to send message and immediately transmit to a DMA engine on the next target compute node (904) the same unprocessed request to send message. That unprocessed message is transmitted in this way to all the target compute nodes of the broadcast. Broadcasting the request to send message allows the target DMA engines to receive the request to send message as fast as possible In the example of FIG. 8, in response to receiving a request to send message, the core processor (915, 917, 919) of each target node (902, 904, and 906) then processes (918, 920, and 922) the message in the same manner. Each core processor receives data a descriptor of the request to send message (912) from an injection fifo maintained by the target DMA engine and instructs the target DMA engine to send in response to the request to send message (914) an acknowledgement message that includes data storage information such that the origin DMA may effect a direct put operation on the target compute node. In the example of FIG. 8, the acknowledgement message is implemented as a clear to send ('CTS') message (914, 914, and 944).

In the example of FIG. 8, the clear to send messages may be send as a direct put operation rather than a messaging operation to a reception fifo buffer such that the origin DMA is notified of the clear to send without invoking a processor core on the origin compute node. Alternatively, the clear to send message may be sent to a reception fifo for the origin DMA engine which is processed by use of a core processor on the origin compute node.

In the example of FIG. 8, to determine that all the target DMA engines are ready to receive the data of the direct put operation, the origin DMA engine (910) of the origin compute node (802) establishes a check-in counter having a value equal to the number of target DMA engines. The origin DMA engine (910) decrements the check-in counter upon receiving each acknowledgement message (914, 934, and 944) from each target DMA engine of each target compute node (902, 904, and 906).

The check-in counter may be implanted as data storage have a length of corresponding to the length of a clear to send message. In such cases, a target DAM engine may provide a direct put of the clear to send message to that data storage. Such a clear to send message with a direct put may for example write zeros or ones to the data storage. When all the data storage has then been written to, such as by all ones or zeros, for example, the counter may be considered decremented to zero. In this manner, the direct put of the clear to send message itself may assists in decrementing the counter. The use of such a direct put shields processor cores on the origin compute node from having to process clear to send messages.

Upon decrementing the check-in counter to zero, the origin DMA engine (910) instructs a processing core on the origin compute node (802) to initiate the single direct put operation (916). The direct put is implemented as a single direct put operation that is broadcast to all the target compute nodes (902, 904, and 906). The direct put is implemented as a single direct put by setting a deposit bit on each packet used to transmit the data of the direct put operation sent to each target DMA. Setting the deposit bit on each packet used to transmit the data of the direct put operation instructs each target DMA to store the data and forward the data to the next target node.

After the origin DMA engine (910) has sent all the data of the direct put operation (916) the DMA engine (910) invokes a call back function (968) instructing a processor core (908) of the origin compute node (802) that the data of the direct put operation has been sent. Similarly, upon receiving all the data of the direct put operation (916) by each target DMA of each target compute node (902, 904, and 906) the target DMA engines invoke a call back function (966, 964, and 962) instructing a processor core (915, 917, and 919) of each target compute node (902, 904, and 906) that the data of the direct put operation (916) has been received.

As mentioned above, transmitting a request to send message to target DMA engines may use a store and forward implementation. For further explanation, FIG. 9 sets forth a calling sequence diagram illustrating a method for remote direct memory access according to the present invention that uses a store and forward implementation and in which only one target DMA engine sends to the origin DMA an acknowledgement message acknowledging that all the target DMA engine are prepared to receive a data transmission from the origin DMA engine.

In the example of FIG. 9, a processor core (908) of the origin compute node (802) invokes a function call (950) on the DMA engine (910) of the origin compute node (802) to initiate a direct put operation to transfer data to data storage on the target compute nodes (902, 904, and 906). In the example of FIG. 9, in response to the function call (950), the DMA engine (910) sends a request to send (952) message to a first target DMA of a first target compute node (902) a descriptor of which is placed in a reception fifo buffer of the target DMA engine. In the example of FIG. 9, a core processor (915) of the first target node (902) processes the request to send message by retrieving the descriptor of the request to send message (912) and instructing a target DMA engine of the first target compute node including in the request to send message data storage information directing the origin DMA (910) to store the data in memory on the target compute node and preparing to receive the data of the direct put operation. The DMA engine of the first target node (902) processes the request to send message by including data storage information about the target node such that the origin node may effect a direct put operation with the target node and then forwards the processed request to send message to the next compute node (904).

In the example of FIG. 9, a core processor (917) of the second target node (904) then invokes the processing of the request to send message by retrieving the descriptor of the now once processed request to send message (912) and instructing a DMA engine on the second target compute node (904) to include in the request to send message data storage information for effecting a direct put operation with that target compute node (904) and preparing to receive the data of the direct put operation. The DMA engine of the second target node (904) then forwards the processed request to send message to the next compute node (906).

In the example of FIG. 9, a core processor (919) of the third target node (906) then processes the request to send message by retrieving the descriptor of the now twice processed request to send message (952) and instructing a DMA engine on the third target compute node (906) to include in the request to send message data storage information for effecting a direct put with that target compute node (906) and preparing to receive the data of the direct put operation. The DMA engine of the third target node (906), and in this simple example the last target node, then sends an acknowledgement message to the origin DMA (960) acknowledging that all the target DMA engine are prepared to receive a data transmission from the origin DMA engine. In the example of FIG. 9, the acknowledgement message is implemented as a remote get (960) message.

Upon receiving the remote get message (960) the origin DMA engine (910) of FIG. 9 instructs a processing core on the origin compute node (802) to initiate the single direct put operation (916). The direct put is implemented as a single direct put operation that is broadcast to all the target compute nodes (902, 904, and 906). The direct put is implemented as a single direct put by setting a deposit bit on each packet used to transmit the data of the direct put operation sent to each target DMA. Setting the deposit bit on each packet used to transmit the data of the direct put operation instructs each target DMA to store the data and forward the data to the next target node.

After the origin DMA engine (910) has sent all the data of the direct put operation (916) the DMA engine (910) invokes a call back function (968) instructing a processor core (908) of the origin compute node (802) that the data of the direct put operation has been sent. Similarly, upon receiving all the data of the direct put operation (916) by each target DMA of each target compute node (902, 904, and 906) the target DMA engines invoke a call back function (966, 964, and 962) instructing a processor core (915, 917, and 919) of each target compute node (902, 904, and 906) that the data of the direct put operation (916) has been received.

Exemplary embodiments of the present invention are described largely in the context of a fully functional computer system for remote direct memory access. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications.

Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of remote direct memory access (DMA), the method comprising:
   transmitting, from an origin DMA engine on an origin compute node to a plurality target DMA engines on target compute nodes, a request to send message, the request to send message specifying data to be transferred from the origin DMA engine to data storage on each target compute node, including a data storage reference and a data length, including broadcasting the request to send message to each target DMA engine on each target compute node, wherein broadcasting the request to send message further comprises sending, by the origin DMA engine to a first target DMA engine, the request to send message, and for each target DMA engine beginning with the first target DMA engine: copying the request to send message to local memory and forwarding the request to send message to a next DMA engine;
   receiving, by each target DMA engine on each target compute node, the request to send message;
   preparing, by each target DMA engine, to store the specified data according to the data storage reference and the data length, including assigning a base storage address for the data storage reference;
   sending, by each of the target DMA engines, an acknowledgment message in response to receiving the request to send message, the acknowledgment message acknowledging that all the target DMA engines are prepared to receive a data transmission from the origin DMA engine;
   receiving, by the origin DMA engine, the acknowledgement message from each of the target DMA engines; and
   transferring, by the origin DMA engine, the specified data to data storage on each of the target compute nodes according to the data storage reference using a single direct put operation.

2. The method of claim 1 wherein receiving, by the origin DMA engine, the acknowledgement message from each of the target DMA engines further comprises:
   establishing, by the origin DMA engine, a check-in counter having a value equal to the number of target DMA engines;
   decrementing, by the origin DMA engine the check-in counter upon receiving an acknowledgement message from each target DMA engine; and
   instructing, by the origin DMA engine upon decrementing the check-in counter to zero, a processing core on the origin compute node to initiate the single direct put operation.

3. The method of claim 1 wherein receiving, by each target DMA engine on each target compute node, the request to send message further comprises:
   processing, by at least one target DMA engine, the request to send message; and
   forwarding, by the at least one target DMA engine, the request to send message to another DMA engine.

4. The method of claim 1 wherein receiving, by the origin DMA engine, the acknowledgement message from each of the target DMA engines further comprises receiving a remote get message from the last target compute node to receive the request to send message.

5. A parallel computer capable of remote direct memory access, the parallel computer comprising a plurality of compute nodes, each compute node comprising a direct memory access (DMA') controller, a DMA engine installed upon the DMA controller, a computer processor, a computer memory operatively coupled to the computer processor, the computer memory having disposed within it computer program instructions that, when executed by the computer processor, cause the computer processor to carry out the steps of:
   transmitting, from an origin DMA engine on an origin compute node to a plurality target DMA engines on target compute nodes, a request to send message, the request to send message specifying data to be transferred from the origin DMA engine to data storage on each target compute node, including a data storage reference and a data length, including broadcasting the request to send message to each target DMA engine on each target compute node, wherein broadcasting the request to send message further comprises sending, by the origin DMA engine to a first target DMA engine, the request to send message, and for each target DMA engine beginning with the first target DMA engine: copying the request to send message to local memory and forwarding the request to send message to a next DMA engine;
   receiving, by each target DMA engine on each target compute node, the request to send message;
   preparing, by each target DMA engine, to store the specified data according to the data storage reference and the data length, including assigning a base storage address for the data storage reference;
   sending, by each of the target DMA engines, an acknowledgment message in response to receiving the request to send message, the acknowledgment message acknowledging that all the target DMA engines are prepared to receive a data transmission from the origin DMA engine;
   receiving, by the origin DMA engine, the acknowledgement message from each of the target DMA engines; and
   transferring, by the origin DMA engine, the specified data to data storage on each of the target compute nodes according to the data storage reference using a single direct put operation.

6. The parallel computer of claim 5 wherein receiving, by the origin DMA engine, the acknowledgement message from each of the target DMA engines includes:
   establishing, by the origin DMA engine, a check-in counter having a value equal to the number of target DMA engines;
   decrementing, by the origin DMA engine the check-in counter upon receiving an acknowledgement message from each target DMA engine; and instructing, by the origin DMA engine upon decrementing the check-in counter to zero, a processing core on the origin compute node to initiate the single direct put operation.

7. The parallel computer of claim 5 wherein receiving, by each target DMA engine on each target compute node, the request to send message includes:
   processing, by at least one target DMA engine, the request to send message; and
   forwarding, by the at least one target DMA engine, the request to send message to another DMA engine.

8. The parallel computer of claim 5 wherein receiving, by the origin DMA engine, the acknowledgement message from each of the target DMA engines includes receiving a remote get message from the last target compute node to receive the request to send message.

9. A recordable computer readable storage medium for remote direct memory access, wherein the recordable computer readable storage medium is not a signal, the recordable computer readable storage medium comprising computer program instructions that, when executed by a computer processor, cause the computer processor to carry out the steps of:
   transmitting, from an origin direct memory access ('DMA') engine on an origin compute node to a plurality target DMA engines on target compute nodes, a request to send message, the request to send message specifying data to be transferred from the origin DMA engine to data storage on each target compute node, including a data storage reference and a data length, including broadcasting the request to send message to each target DMA engine on each target compute node, wherein broadcasting the request to send message further comprises sending, by the origin DMA engine to a first target DMA engine, the request to send message, and for each target DMA engine beginning with the first target DMA engine: copying the request to send message to local memory and forwarding the request to send message to a next DMA engine; receiving, by each target DMA engine on each target compute node, the request to send message;
   preparing, by each target DMA engine, to store the specified data according to the data storage reference and the data length, including assigning a base storage address for the data storage reference;
   sending, by each of the target DMA engines, an acknowledgment message in response to receiving the request to send message, the acknowledgment message acknowledging that all the target DMA engines are prepared to receive a data transmission from the origin DMA engine;
   receiving, by the origin DMA engine, the acknowledgement message from each of the target DMA engines; and
   transferring, by the origin DMA engine, the specified data to data storage on each of the target compute nodes according to the data storage reference using a single direct put operation.

10. The recordable computer readable storage medium of claim 9 wherein receiving, by the origin DMA engine, the acknowledgement message from each of the target DMA engines includes:
    establishing, by the origin DMA engine, a check-in counter having a value equal to the number of target DMA engines;
    decrementing, by the origin DMA engine the check-in counter upon receiving an acknowledgement message from each target DMA engine; and
    instructing, by the origin DMA engine upon decrementing the check-in counter to zero, a processing core on the origin compute node to initiate the single direct put operation.

11. The recordable computer readable storage medium of claim 9 wherein receiving, by each target DMA engine on each target compute node, the request to send message includes:
    processing, by at least one target DMA engine, the request to send message; and
    forwarding, by the at least one target DMA engine, the request to send message to another DMA engine.

12. The recordable computer readable storage medium of claim 9 wherein receiving, by the origin DMA engine, the acknowledgement message from each of the target DMA engines includes receiving a remote get message from the last target compute node to receive the request to send message.

* * * * *